United States Patent Office 3,547,997
Patented Dec. 15, 1970

3,547,997
2-(2-IMINO-ALKYL OR 2-IMINO-CYCLOALKYL)-PHENOLS FROM O-PHENYL KETOXIMES
Aram Mooradian, Schodack, and Paul E. Dupont, Menands, N.Y., assignors to Sterling Drug Inc., New York, N.Y., a corporation of Delaware
No Drawing. Filed May 9, 1967, Ser. No. 637,093
Int. Cl. C07c *119/00*
U.S. Cl. 260—566
14 Claims

ABSTRACT OF THE DISCLOSURE 2-(2-iminoalkyl)-phenols are prepared by a novel rearrangement process of reacting in the approxiate range of 20 to 40° C. an O-phenyl ketoxime with a strong acid in a non-aqueous medium. The novel 2-(2-imino-alkyl)-phenols have antibacterial properties and are readily hydrolyzed to the corresponding 2-(2-keto-alkyl)-phenols which are useful as intermediates for the preparation of benzofuran derivatives.

---

This invention relates to a novel rearrangement process for preparing 2-(2-imino-alkyl)-phenols and to said phenols.

The invention sought to be patented, in its process aspect, resides in the process for producing a 2-(2-iminoalkyl)-phenol which comprises reacting in the approximate range of 20 to 40° C. an O-phenyl ketoxime with a strong acid in a nonaqueous medium. Preferred ketoximes because of their ready availability are O-phenyl ketoximes of low molecular weight ketones, e.g., a di-(lower-alkyl)ketone, a cycloalkanone having five to six ring carbon atoms, a lower-alkyl phenyl ketone.

The invention sought to be patented, in its composition aspect, resides in the class of compounds which are produced by the above process and which we designate 2-(2-imino-alkyl)-phenols. Accordingly, we depict these compounds as having 2-imino-alkyl attached to the 2- or ortho-position of a phenol. The tangible embodiments of this composition aspect of the invention are isolated in the form of their acid-addition salts, preferably hydrochlorides, and are readily converted by hydrolysis to the corresponding 2-(2-keto-alkyl)-phenols which are useful intermediates for the preparation of benzofuran derivatives which have chemotherapeutic, e.g., antibacterial, and pharmacological, e.g., anti-inflammatory, properties, as determined by standard evaluation procedures.

Another composition aspect of the invention sought to be patented resides in the compound, 2 - (2-hydroxy-5-nitrophenyl)cyclopentanone, which was found to possess the inherent applied use characteristics of having chemotherapeutic, e.g., antibacterial, properties, as determined by standard chemotherapeutic evaluation procedures.

The term "lower-alkyl," as used throughout this specification, means an alkyl radical having from one to six carbon atoms inclusive, illustrated by methyl, ethyl, isopropyl, n-propyl, n-butyl, sec-butyl, isobutyl, n-amyl, n-hexyl, and the like.

The term "lower-alkanoyl," as used throughout this specification, means alkanoyl radicals having from one to six carbon atoms inclusive which can be arranged as straight or branched chains, among which are, for purposes of illustration but without limiting the generality of the foregoing, formyl, acetyl, propionyl (n-propanoyl), isobutyryl (2-methyl-n-propanoyl) and caproyl (n-hexanoyl).

The manner and process of making and using the instant invention will now be generally described so as to enable a person skilled in the art of chemistry to make and use the same, as follows:

Preparation of intermediate O-phenyl ketoximes.—These intermediates, some of which are known and some of which are novel, are prepared by various known procedures. For example, some are prepared by reacting a metal salt of the ketoxime in a polar solvent, e.g., dimethyl sulfoxide, tetrahydrofuran, acetonitrile, dimethylformamide or dimethylacetamide, with an ortho-substitutable active phenyl halide, i.e., a phenyl halide where phenyl is unsubstituted at one ortho position and is substituted at either one or both of the para and the other ortho positions by a low molecular weight electron withdrawing group, as illustrated hereinbelow. The reaction is usually exothermic and is carried out by mixing the reactants in the solvent and agitating the reaction mixture until the reaction is complete. Gentle heating, up to about 50 to 75° C., might be necessary to start the reaction in some instances wherein gentle heating is then continued to ensure completion of the reaction. Alkali metal salts of the oximes are preferred because of their ready availability and ease of preparation by generally known procedures, e.g., by reacting sodium hydride or potassium alkoxide with the oxime. The foregoing particular intermediates, their preparation and their conversion to benzofurans by heating in an acidic medium are disclosed and, in part, together with some of the resulting benzofurans are claimed in the Mooradian copending U.S. patent application Ser. No. 596,395, filed Nov. 23, 1966.

Other O-phenyl ketoximes can be prepared by other means. For example, ketoximes where O-phenyl is unsubstituted or substituted by groups other than electron withdrawing groups illustrated above are prepared by heating, preferably by refluxing in a suitable solvent, e.g., ethanol, an O-phenylhydroxylamine and a ketone in the presence of a trace of a strong inorganic acid, e.g., hydrogen chloride.

Conversion of O-phenyl ketoximes to 2 - (2-iminoalkyl)-phenols.—This novel rearrangement conversion is carried out by reacting in the approximate range of 20 to 40° C. an O-phenyl ketomixe with a strong acid in a nonaqueous medium to form a 2-(2-imino-alkyl)-phenol. The reaction is readily conducted by contacting the reactants in a nonaqueous medium within said approximate temperature range. Temperatures above this range should ordinarily be avoided since the yield of the product is undesirably diminished because of formation of by-products. At temperatures below said range the rate of reaction is ordinarily too slow for practical purposes and the reaction time is undesirably prolonged. The time necessary for conversion of the O-phenyl ketoxime to 2-(2-imino-alkyl)-phenol varies from about four hours to about eighteen hours or longer, depending upon the temperature used and relative reactivity of the reactants. Progress of the reaction can be followed using thin layer chromatography to ascertain relative quantities of the starting O-phenyl ketoximes and 2 - (2-imino-alkyl)-phenol product. The reaction is usually mildly exothermic and is conveniently run by reacting, preferably at about 25 to 35° C., the O-phenol ketoxime with a hydrogen halide, preferably hydrogen chloride, in a lower-alkanoic acid, preferbaly acetic acid, or a lower-alkanol preferably ethanol. Moderate warming up to approximately 40° C., can be used to effect dissolution of the ketoxime. Modifications of the foregoing process will be apparent to a chemist skilled in the art: for example, other strong inorganic acids, e.g., hydrogen bromide, hydrogen iodide, hydrogen fluoride, sulfuric acid, boron trifluoride etherate, and the like, or strong organic sulfonic acids, e.g., methanesulfonic acid, ethanesulfonic acid, benzenesulfonic acid, p-toluenesulfonic acid, and the like, can be used; and, further, other suitable nonaqueous solvents, e.g., tetrahydrofuran, dioxane, ether, and the like, can be used to provide the nonaqueous reaction medium.

For purpose of illustration but without limiting the generality of the foregoing, the conversion is ilustrated for preferred embodiments as follows:

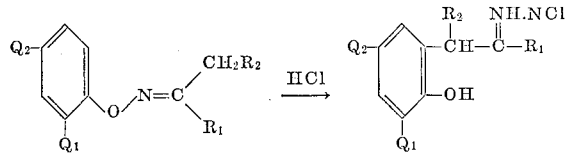

where $Q_1$ and $Q_2$ are each hydrogen, lower-alkyl, halo, lower-alkoxy, nitro, trihalomethyl, carbo-(lower-alkoxy), carboxy, cyano, lower-alkanoyl, phenylsulfonyl, N,N-di-(lower-alkyl)sulfamyl, and the like; $R_1$ is lower-alkyl or phenyl; $R_2$ is hydrogen, alkyl having from one to five carbon atoms; or, $R_1$ and $R_2$ are attached to form in II, 2-iminocyclopentyl or 2-iminocyclohexyl. Variations of the above preferred structures of Formulas I and II encompassed in the process of the invention will be apparent to the chemist.

The molecular structure of the 2-(2-imino-alkyl)-phenols and corresponding 2-(2-keto-alkyl)-phenols were assigned on the basis of study of their infrared and NMR spectra, and confirmed by the correspondence of calculated and found values for the elementary analyses for representative examples.

The best mode contemplated for carrying out the invention will now be set forth as follows:

(A) PREPARATION OF INTERMEDIATE O-PHENYL KETOXIMES (1) O-(4-nitrophenyl)acetone oxime.—The solution of 3.65 g. of acetone oxime in 125 ml. of dimethyl sulfoxide was added 2.15 g. of a 56% dispersion of sodium hydride in mineral oil. The resulting mixture was stirred for fifteen minutes and then there was added 10.1 g. of 4-bromonitrobenzene. After the subsequent exothermic reaction and bubbling had subsided, the reaction mixture was poured into water and the resulting brown precipitate was collected. The solid was suspended in alcohol and water added to the suspension. The solid that separated was collected, dried and recrystallized from isopropyl alcohol to yield 4.9 g. of O-(4-nitrophenyl)acetone oxime, M.P. 104–106° C.

(2) O-(2,4-dinitrophenyl)acetone oxime M.P. 87–91° C., was prepared following the procedure of Example A(1) by reacting the sodium salt of acetone oxime and 2,4 - dinitrochlorobenzene in tetrahydrofuran for two hours.

(3) O - (4 - nitrophenyl)acetophenone oxime, M.P. 122–124° C., was prepared as in Example A(1) by refluxing the sodium salt of acetophenone oxime and 4-nitrofluorobenzene in tetrahydrofuran for ten hours.

(4) O-(2 - nitrophenyl)acetone oxime, M.P. 56–59° C., was prepared as in Example A(1) by stirring the sodium salt of auetone oxime and 2-nitrobromobenzene in dimethyl sulfoxide for forty-five minutes.

(5) O-(2 - carboxy-4-nitrophenyl)acetone oxime.—To a solution of 20.1 g. of 2-chloro-5-nitrobenzoic acid in 250 ml. of tetrahydrofuran was added with stirring 4.27 g. of a 56.2% dispersion of sodium hydride in mineral oil. Sufficient dimethyl sulfoxide was added to the suspension to effect dissolution. A solution of 7.3 g. of acetone oxime in 100 ml. of tetrahydrofuran was heated with 4.27 g. of 56.2% sodium hydride followed by addition of 50 ml. of dimethyl sulfoxide. The mixture was heated with stirring until evolution of hydrogen had ceased (about fifteen minutes) and then poured into the solution of the benzoic acid salt. The resulting suspension was first stirred at room temperature for about forty-five minutes and then heated at reflux for about ninety minutes. The reaction mixture was next treated with water and the tetrahydrofuran was removed by distilling in vacuo. The remaining aqueous layer was extracted with n-pentane to remove the mineral oil, treated with decolorizing charcoal and filtered, and the filtrate acidified with 10% aqueous hydrochloric acid. The solid that separated was collected and recrystallized from ethyl acetate to yield 16.0 g. of O-(2-carboxy-4-nitrophenyl)acetone oxime, M.P. 169–171° C. (with decomposition).

(6) O-(2 - nitro-4-trifluoromethylphenyl)acetone oxime, M.P. 52–55° C., was prepared as in Example A(1) by stirring at room temperature for one hour the sodium salt of acetone oxime and 4-chloro-3-nitrobenzotrifluoride in dimethyl sulfoxide. After pouring the reaction mixture into ice and water, the product was obtained by extracting with ether, evaporating off the ether, and recrystallizing from ethanol and then from n-hexane.

(7) O-(4 - trifluoromethylphenyl)acetone oxime.—To 200 ml. of dry dimethylformamide was added 7.3 g. of acetone oxime and 11.2 g. of potassium tertiary-butoxide. The resulting mixture was stirred for a few minutes and then there was added 16.4 g. of 4-fluorobenzotrifluoride and the reaction mixture was heated with stirring for three hours on a steam bath. It was then poured into water whereupon the crystalline product separated. The product was collected and recrystallized from n-pentane, using decolorizing charcoal, to yield 12.6 g. of O-(4-trifluoromethylphenyl)acetone oxime, M.P. 46–49° C.

(8) O-(4-cyanophenyl)acetone oxime, M.P. 100–103° C., was prepared as in Example A(6) by stirring at about 50–60° C. for one hour a mixture of the potassium salt of acetone oxime (using potassium tertiary-butoxide) and 4-fluorobenzonitrile in dimethyl sulfoxide.

(9) O-(4 - nitrophenyl)cyclohexanone oxime.—To a solution of 17 g. of cyclohexanone oxime in 100 ml. of dimethyl sulfoxide and 300 ml. of tetrahydrofuran was added 6.45 g. of a 56% solution of sodium hydride in mineral oil. This mixture was stirred until most of the bubbling subsided and then there was added 23.7 g. of 4-chloronitrobenzene. After the reaction mixture had been stirred for an additional six hours at room temperature, the tetrahydrofuran was then removed by distilling in vacuo and water was added to the residue. The crystalline product was collected and recrystallized twice from isopropyl alcohol to yield 12.5 g. of O-(4-nitrophenyl)cyclohexanone oxime, M.P. 99–101° C.

(10) 4-[(4-nitrophenoxy)imino]cyclohexyl benzoate, M.P. 123.5–125.0° C., was prepared as in Example A(6) by reacting the potassium salt of 4-benzoyloxycyclohexanone oxime and 4-fluoronitrobenzene in dimethylacetamide for about fifteen mniutes.

The above intermediate 4-benzoyloxycyclohexanone oxime was prepared as follows: A reaction mixture containing 43.6 g. of 4-benzoyloxycyclohexanone, 15.3 g. of hydroxylamine hydrochloride and 150 ml. of pyridine was heated on a steam bath for four hours and then poured into one liter of water. The oil that separated was extracted with ether. The ether extract was washed with water, dried over anhydrous magnesium sulfate and calcium sulfate, treated with decolorizing charcoal and filtered, and the ether removed by vacuum distillation. The aqueous layer was removed by decantation and the remaining oil was washed several times with water whereupon the oil solidified. The solid was collected, washed with water, dried in a vacuum oven at 45° for two hours, and recrystallized twice from ether to yield 26 g. of crystalline 4-benzoyloxycyclohexanone oxime, M.P. 106–108° C.

(11) O-(4-nitrophenyl)-2-butanone oxime, M.P. 41–42° C., was prepared as in Example A(6) by stirring a mixture of the sodium salt of 2-butanone oxime and 4-fluoronitrobenzene in tetrahydrofuran for two hours.

(12) O-(4-trifluoromethylphenyl)acetophenone oxime, M.P. 94–97° C., was prepared as in Example A(1) by refluxing for three hours a mixture of the sodium salt of acetophenone oxime and 4-fluorobenzotrifluoride in a mixture of tetrahydrofuran and dimethyl sulfoxide.

(13) O-(2-chloro-4-nitrophenyl)acetone oxime, M.P. 117–119° C., was prepared as in Example A(1) by heating on a steam bath for six hours a stirred mixture of the potassium salt (using potassium tert-butoxide) of acetone oxime and 3,4-dichloronitrobenzene in dimethylformamide.

(14) O-(4 - N,N - dimethylsulfamylphenyl)acetophenone oxime, M.P. 95–97° C., was obtained as in Example A(6) by stirring with no external heating for two hours a mixture of the sodium salt of acetophenone oxime and N,N-dimethyl - 4 - fluorobenzenesulfonamide in a mixture of tetrahydrofuran and dimethyl sulfoxide. The oxime product was recrystallized from ether.

(15) O-(4 - carbethoxyphenyl)acetophenone oxime, M.P. 52–54° C., from n-heptane, was prepared as in Example A(1) by heating on a steam bath with stirring for two hours the sodium salt of acetophenone oxime and ethyl 4-fluorobenzoate in a mixture of tetrahydrofuran and dimethyl sulfoxide.

(16) O-(4-acetylphenyl)acetone oxime, M.P. 50–53° C., from n-hexane, was prepared as in Example A(7) by stirring at room temperature for three hours the potassium salt of acetone oxime and 4-fluoroacetophenone in dimethyl sulfoxide.

(17) O-(4-phenylsulfonylphenyl)acetone oxime, M.P. 130–134° C., from isopropyl alcohol, was prepared as in Example A(1) by mixing with stirring the sodium salt of acetone oxime and 4-fluorophenyl phenyl sulfone in a mixture of tetrahydrofuran and dimethyl sulfoxide and allowing the reaction mixture to stand at room temperature for three days.

(18) O-(4-N,N - dimethylsulfamylphenyl)-4-methoxyacetophenone oxime, M.P. 135–137° C., from ethanol, was prepared as in Example A(1) by heating on a steam bath for two hours a stirred mixture of the sodium salt of 4-methoxyacetophenone oxime and N,N-dimethyl-4-fluorobenzenesulfonamide in a mixture of tetrahydrofuran and dimethyl sulfoxide.

(19) O-(2 - nitrophenyl)-4-methoxyacetophenone oxime, M.P. 111–113° C., from isopropyl alcohol, was prepared as in Example A(1) by heating on a steam bath for two hours a stirred mixture of the sodium salt of 4-methoxyacetophenone oxime and 2-chloronitrobenzene in a mixture of tetrahydrofuran and dimethyl sulfoxide.

(20) O-(4-carbethoxyphenyl) - 4 - methoxyacetophenone oxime, M.P. 90–92° C., from isopropyl alcohol, was prepared as in Example A(1) by heating on a steam bath for three hours a stirred mixture of the sodium salt of 4-methoxyacetophenone oxime and ethyl 4-fluorobenzoate in a mixture of tetrahydrofuran and dimethyl sulfoxide.

(21) O-(4 - nitrophenyl)cyclopentanone oxime, M.P. 128–130° C., from n-hexane, was prepared as in Example A(1) by heating on a steam bath for two hours a stirred mixture of the sodium salt of cyclopentanone oxime and 4-fluoronitrobenzene in a mixture of tetrahydrofuran and dimethyl sulfoxide.

(22) O-(2-trifluoromethylphenyl)acetophenone oxime, an oil, was prepared as in Example A(6) by heating on a steam bath a stirred mixture of the sodium salt of acetophenone oxime and 2-fluorobenzotrifluoride in a mixture of tetrahydrofuran and dimethyl sulfoxide.

(23) O-phenylacetophenone oxime.—A solution containing 5.3 g. of O-phenylhydroxylamine and 5.9 g. of acetophenone in 100 ml. of ethanol containing a trace of hydrogen chloride was heated on a steam bath at reflux for three hours. The solvent was then distilled off in vacuo to yield 9.9 g. of O-phenylacetophenone oxime. Substitution of a molar equivalent quantity of O-(4-toyl)hydroxylamine or 0-(4-methoxyphenyl)hydroxylamine for O-phenylhydroxylamine in the above procedure yields O-(4-tolyl)acetophenone oxime or O-(4-methoxyphenylacetophenone oxime, respectively.

(24) O-(4-chlorophenyl)acetone oxime.—A solution containing 12.8 g. of O-(4-chlorophenyl)hydroxylamine and 5.2 g. of acetone in 50 ml. of absolute ethanol containing about 15 drops of concentrated hydrochloric acid was refluxed for about forty minutes and then allowed to stand overnight at room temperature. The solvent was distilled off in vacuo and the residual oily material was distilled under reduced pressure to yield 6.9 g. of O-(4-chlorophenyl)acetone oxime, B.P. 55–60° C. at 0.05–0.10 mm. Substitution of O-(2,4-dichlorophenyl)hydroxylamine or O-(4-bromophenylhydroxylamine for O-(4-chlorophenyl)hydroxylamine in the above procedure yields, respectively, O-(2,4-dichlorophenyl)acetone oxime or O-(4-bromophenyl)acetone oxime.

(25) O - (4-nitro-2-trifluoromethylphenyl)acetone oxime, M.P. 87–90° C., was prepared as in Example A(1) by stirring at room temperature for two hours the sodium salt of acetone oxime and 4-chloro-3-trifluoromethylnitrobenzene in a mixture of tetrahydrofuran and dimethyl sulfoxide.

(B) CONVERSION OF O-PHENYL KETOXIMES TO 2-(2-IMINO-ALKYL)PHENOLS (1) 2-(2-iminopropyl) - 6 - nitrophenol.—A solution containing 12.0 g. of O-(2-nitrophenyl)acetone oxime and 50 ml. of 1.8 N hydrogen chloride in acetic acid (oxime dissolved by gently warming the acetic acid solution to about 35–40° C.) was allowed to stand at room temperature for twenty-four hours. The reaction mixture was treated with ether and the resulting precipitate was collected, dried in vacuo at 50° C. to yield 11.2 g. of the yellow crystalline 2-(2-iminopropyl)-6-nitrophenol as its hydrochloride, M.P. 151° C. with decomposition. A second crop of 1.5 g. of the product was obtained from the filtrate. The structures of this and subsequent 2-(2-iminoalkyl)-phenols produced by the process of the invention were confirmed by their infrared and nuclear magnetic resonance spectral analyses, and by their elementary analyses.

The following compounds were prepared using the above procedure of Example B(1) and the appropriate O-phenyl ketoxime. The compounds crystallized out of the reaction mixture without the addition of any ether. The reaction mixture was allowed to stand at room temperature for about sixteen hours unless otherwise noted.

(2) 2-(2-iminopropyl)-4-nitrophenol as its hydrochloride, 21.6 g. (94% yield), M.P. 171° C., using 19.4 g. of O-(4-nitrophenyl)acetone oxime in 150 ml. of 1.8 N hydrogen chloride in acetic acid.

(3) 2-[2-imino-2-(4-methoxyphenyl)ethyl] - 6 - nitrophenol as its hydrochloride, 8.6 g. (67%), M.P. 194° C., from methanol-ether as yellow needles, using 11.5 g. of O-(2-nitrophenyl)-4-methoxyacetophenone oxime in 300 ml. of 1.8 N hydrogen chloride in acetic acid. 2-[2-imino-2 - (4-methoxyphenyl)ethyl]-6-nitrophenol hydrochloride was found to have in vitro bacteriostatic activity against *Staphylococcus aureus* at a test concentration of 0.10 mg./cc.

(4) 2-[2-imino - 2 - (4-methoxyphenyl)ethyl]-4-N,N-dimethylsulfamylphenol as its hydrochloride, 11.8 g. (88%), M.P. 213° C., using 12.1 g. of O-(4-N,N-dimethylsulfamylphenyl)-4-methoxyacetophenone oxime and 175 ml. of 1.8 N hydrogen chloride in acetic acid. 2-[2-imino - 2 - (4-methoxyphenyl)ethyl]-4-N,N-dimethylsulfamylphenol hydrochloride was found to have in vitro bacteriostatic activity against *Staphylococcus aureus* at a test concentration of 0.10 mg/cc.

(5) 4-cyano-2-(2-iminopropyl)-phenol as its hydrochloride, 13.0 g., M.P. 205° C., using 15.0 g. of O-(4-cyanophenyl)acetone oxime and 90 ml. of 1.8 N hydrogen chloride in acetic acid, and allowing the reaction mixture to stand about twenty-four hours at room temperature. 4-cyano-2-(2-iminopropyl)-phenol hydrochloride was found to have in vitro bacteriostatic activity against *Staphylococcus aureus* at a test concentration of 0.10 mg./cc.

(6) 2-(2-imino-2-phenylethyl)-4-nitrophenol as its hydrochloride, 2.2 g., M.P. 175–179° C., using 2.5 g. of O-(4-nitrophenyl)acetophenone oxime and 85 ml. of 1.8 N hydrogen chloride in acetic acid.

(7) 4-acetyl-2-(2-iminopropyl)-phenol as its hydrochloride, 4.5 g., M.P. 176° C., using 5.0 g. of O-(4-acetylphenyl)acetone oxime, 25 ml. of 1.8 N hydrogen chloride in acetic acid and a reaction period of about five hours at room temperature.

(8) 2-(2-imino-2-phenylethyl) - 6 - trifluoromethylphenol as its hydrochloride, 4.1 g., M.P. 182° C., from absolute ethanol-ether, using 9.3 g. of O-(4-trifluoromethylphenyl)acetophenone oxime and 25 ml. of 1.8 N hydrogen chloride in acetic acid.

(9) 2-(2-iminocyclopentyl)-4-nitrophenol as its hydrochloride, 4.9 g., M.P. 207–210° C. with decomposition, using 6.0 g. of O-(4-nitrophenyl)cyclopentanone oxime and 30 ml. of 1.8 N hydrogen chloride in acetic acid.

(10) 2-(2-imino-2-phenylethyl)phenyl as its hydrochloride, 5.8 g., M.P. 210° C., from methanol-ether, using 9.9 g. of O-phenylacetophenone oxime and 50 ml. of 1.8 N hydrogen chloride in acetic acid. 2-(2-imino-2-phenylethyl)-phenol hydrochloride was found to have in vitro bacteriostatic activity against *Staphylococcus aureus* at a test concentration of 0.05 mg./cc.

(11) 2-(2-iminocyclohexyl)-4-nitrophenol as its hydrochloride, 32.5 g., M.P. 223° C., using 30.0 g. of O-(4-nitrophenyl)-cyclohexanone oxime and 200 ml. of 1.8 N hydrogen chloride in acetic acid.

(12) 2-(2-iminopropyl)-4-phenylsulfonylphenol as its hydrochloride, 21.4 g., M.P. 198° C., using 20.0 g. of O-(4-phenylsulfonylphenyl)acetone oxime, 210 ml. of 1.8 N hydrogen chloride in acetic acid and a reaction period of about four hours at room temperature.

(13) 2-(2-iminopropyl)-4,6-dinitrophenol as its hydrochloride, 7.7 g., M.P. 174–176° C. with decomposition, using 20.0 g. of O - (2,4 - dinitrophenyl)acetone, oxime 125 ml. of 1.8 N hydrogen chloride in acetic acid and a reaction period of about two days at room temperature.

(14) 2-(2-iminopropyl)-4-trifluoromethylphenol as its hydrochloride, 3.8 g., M.P. 159° C., using 4.6 of O-(4-trifluoromethylphenyl)acetone oxime and 30 ml. of 1.8 N hydrogen chloride in acetic acid.

(15) 4-chloro-2-(2-iminopropyl)phenol as its hydrochloride, 5.5 g., M.P. 156° C., using 6.8 g. of O-(4-chlorophenyl)acetone oxime, 50 ml. of 1.8 N hydrogen chloride in acetic acid, a reaction period of about twenty-four hours and addition of ether to the reaction mixture to precipitate the product.

Similarly, the other O-phenyl ketoximes of Example A are converted as in Example B(1) to the corresponding 2-(2-imino-alkyl)-phenols as their hydrochlorides.

(16) 2-(2-iminopropyl)-4-nitrophenol as its hydrochloride also was prepared as in Example B(2) except the reaction mixture of 1.0 g. of O-(4-nitrophenyl)acetone oxime and 20 ml. of 6 N ethanolic hydrogen chloride was kept at 40° C. (using an external bath of refluxing methylene chloride) for about sixteen hours.

(17) 2-(2-iminopropyl)-4-nitrophenol in the form of other acid-addition salts was obtained following the procedure of Example B(2) but using 1.0 g. of O-(4-nitrophenyl)acetone oxime in each instance and the indicated quantities of other strong acids in place of hydrogen chloride, for example: 2-(2-iminopropyl)-4-nitrophenol hydrobromide using 10 ml. of 30% hydrogen bromide in acetic acid; 2-(2-iminopropyl)-4-nitrophenol methanesulfonate using 2.0 g. of methanesulfonic acid and 10 ml. of acetic acid; 2-(2-iminopropyl)-4-nitrophenol hydrogen sulfate using 0.38 ml. of concentrated sulfuric acid and 7.6 ml. of acetic acid; 2-(2-iminopropyl)-4-nitrophenol boron trifluoride using 8 ml. of boron trifluoride etherate and 5 ml. of acetic acid. The reactions with methanesulfonic acid and p-toluenesulfonic acid were carried out at room temperature for about sixteen hours (overnight) and the reactions with hydrogen bromide, sulfuric acid and boron trifluoride etherate, at room temperature for three days (over the weekend). The respective acid addition salts were readily hydrolyzed as in Example B(1) to yield 3-acetonyl-4-nitrophenol.

(C) CONVERSION OF 2-(2-IMINO-ALKYL)-PHENOLS TO 2-(2-KETO-ALKYL)-PHENOLS (1) 3-acetonyl-4-hydroxybenzonitrile.—About 100 ml. of water was mixed with 10.0 g. of 4-cyano-2-(iminopropyl)-phenol hydrochloride whereupon the salt dissolved and soon thereafter there separated the product, which was collected, washed with water, dried overnight in vacuo at 60° C. to yield 7.4 g. (89% yield) of 3-acetonyl-4-hydroxybenzonitrile, M.P. 145–149° C.

(2) 2-(2 - hydroxy-5-nitrophenyl)cyclopentanone.—A 10.3 g. portion of 2-(2-iminocyclopentyl)-4-nitrophenol hydrochloride was dissolved in 200 ml. of water and the solution was allowed to stand for about thirty minutes after which time the product had separated. The product was extracted with ethyl acetate; the extract was washed three times with water, treated with n-pentane to cloudiness, and treated with decolorizing charcoal; and, the mixture filtered. To the filtrate was added n-pentane and the solution allowed to stand whereupon there separated only droplets of water, which were separated by decantation. The solvent was then removed by distilling in vacuo and the residue was recrystallized from ethyl acetate to yield 5.9 g. of 2-(2-hydroxy-5-nitrophenyl)cyclopentanone, M.P. 177–179° C. This compound was found to have in vitro bacteriostatic activity against *Staphylococcus aureus* at a test concentration of 0.10 mg./cc.

(3) 1 - (2-hydroxy-5-phenylsulfonylphenyl)-2-propanone.—A 7.0 g. portion of 2-(2-iminopropyl)-4-phenylsulfonylphenol hydrochloride was stirred with 300 ml. of water, the mixture warmed on a steam bath for about ten minutes and then allowed to stand for about four hours at room temperature. The separated product was collected, washed successively with water and n-pentane, and then dried overnight in vacuo at 60° C. to yield 6.0 g. (96%) of 1-(2-hydroxy-5-phenylsulfonylphenyl)-2-propanone, M.P. 170–172° C.

(4) 4-hydroxy-3-(4'-methoxyphenacyl)-N,N-dimethylbenzenesulfonamide, M.P. 149.5–151.5° C., was prepared following the procedure described in Example C(3) using 6.5 g. of 2-[2-imino-2-(4-methoxyphenol)ethyl]-4-N,N-dimethylsulfamylphenol hydrochloride and 250 ml. of water. There was thus obtained 4.5 g. (76.3%) of the product after two recrystallizations from methylene dichloride-n-hexane.

(5) 1 - (2-hydroxy-5-nitrophenyl)-2-propanone, M.P. 190–193° C., was prepared following the procedure described in Example C(1) using 1.0 g. of 2-(2-iminopropyl)-4-nitrophenol hydrochloride and about 50 ml. of water. There was thus obtained 0.6 g. (71%) of the product after one recrystallization from isopropyl alcohol.

(6) 4-nitro-2-phenacylphenol, M.P. 175–179° C., was prepared as in Example C(1) using 1.2 g. of 2-(2-imino-2-phenylethyl)-4-nitrophenol hydrochloride and 50 ml. of water.

(7) 1-(5-acetyl-2-hydroxyphenyl)-2 - propanone, M.P. 112–114° C., was obtained as in Example C(1) using 2.8 g. of 4 - acetyl - 2 - (2-iminopropyl)-phenol hydrochloride and 60 ml. of water. There was thus obtained 1 g. of the product after one recrystallization from methylene dichloride-n-hexane.

(8) 2 - (2 - hydroxy - 5 - nitrophenyl)cyclohexanone, M.P. 186–190° C., was prepared as in Example C(1) by stirring for one hour 10.0 g. of 2 - (2 - iminocyclohexyl)-4 - nitrophenol hydrochloride in 150 ml. of water. There was thus obtained 7.1 g. of the product after one recrystallization from acetone-n-hexane.

Similarly, the other 2 - (2-imino-alkyl)-phenol acid-addition salts of Example B are hydrolyzed as in Example C(1) to yield the corresponding 2 - (2 - keto - alkyl)-phenols.

9

(D) CONVERSION OF 2-(2-IMINO-ALKYL)-PHENOLS TO BENZOFURANS

The foregoing 2 - (2 - imino-alkyl)-phenols as their hydrochlorides are readliy converted to corresponding benzofuran derivatives by heating them in ethanolic hydrogen chloride, as illustrated by the following conversion of 4 - cyano - 2 - (2 - imniopropyl)-phenol hydrochloride to 5 - cyano - 2 - methylbenzofuran: Gaseous hydrogen chloride was bubbled through a mixture of 6.34 g. of 4-cyano - 2 - (2 - iminopropyl) - phenol hydrochloride in 100 ml. of 1.8 N hydrogen chloride in acetic acid heated on a steam bath for about thirteen hours. The reaction mixture was allowed to cool and the solid that separated was collected and washed successively with acetic acid and ether. The filtrate was evaporated in vacuo under reduced pressure to yield more solid. The solids were combined, treated with aqueous sodium hydroxide solution, and the mixture extracted with ether. The ether extract was washed with water, dried over anhydrous sodium sulfate and evaporated in vacuo to yield a solid. The solid was recrystallized from ether n-hexane to yield 3.6 g. of 5-cyano-2-methylbenzofuran, M.P. 75–77° C.

Similarly, the other 2-(2-imino-alkyl)-phenol hydrochlorides of Example B above are converted into the corresponding benzofurans following the above procedure for the conversion of 4-cyano-2-(2-iminopropyl)-phenol hydrochloride to 5 - cyano - 2 - methylbenzofuran, e.g., 2 - (2 - iminopropyl) - 6 - nitrophenol hydrochloride to 2 - methyl - 7 - nitrobenzofuran, 2 - [2 - imino-2-(4-methoxyphenyl)ethyl] - 6 - nitrophenol hydrochloride to 2 - (4 - methoxyphenyl) - 7 - nitrobenzofuran, 2 - (2-imino - 2 - phenylethyl) - 4 - nitrophenol hydrochloride to 5 - nitro - 2 - phenylbenzofuran, 2 - (2 - iminocyclohexyl) - 4 - nitrophenol hydrochloride to 1,2,3,4 - tetrahydro - 8 - nitrodibenzofuran.

(E) CONVERSION OF 2 - (2 - KETO-ALKYL)-PHENOLS TO BENZOFURANS

The foregoing 2 - (2 - keto-alkyl) - phenols of Example C are readily converted to benzofurans by treatment with an acidic agent or dehydrating agent by known procedures, e.g., 1 - (2 - hydroxy - 5 - nitrophenyl) - 2 - propanone to 2 - methyl - 5 - nitrobenzofuran or 1 - (3,5-dinitro-2 - hydroxyphenyl) - 2 - propanone to 5.7 - dinitro - 2-methylbenzofuran by heating the propanone with zinc chloride in acetic acid solution; 4 - nitro - 2 - phenacylphenol to 5 - nitro - 2 - phenylbenzofuran by heating a benzene solution of the phenacylphenol in the presence of phosphorus pentoxide; 1 - (2 - hydroxyphenyl) - 2 - propanone to 2 - methylbenzofuran while standing for forty-eight hours in a desiccator over concentrated sulfuric acid; 2 - phenacylphenol to 2 - phenylbenzofuran by heating the phenacylphenol in acetic acid solution containing a little concentrated hydrochloric acid.

Similarly, the other 2 - (2 - keto-alkyl) - phenols of Example C are converted to benzofurans by the above known procedures, e.g., 3 - acetonyl - 4 - hydroxybenzonitrile to 5 - cyano - 2 - methylbenzofuran, 1 - (5 - acetyl-2 - hydroxyphenyl) - 2 - propanone to 5 - acetyl - 2 - methylbenzofuran, 2 - (2 - hydroxy - 5 - nitrophenyl) cyclohexanone to 1,2,3,4 - tetrahydro - 8 - nitrodibenzofuran.

The subject matter which the applicants regard as their invention is particularly pointed out and distinctly claimed as follows:

1. The process which comprises reacting in the approximate range of 20 to 40° C. with a strong acid selected from the group consisting of hydrogen halide, sulfuric acid, boron trifluoride etherate or strong organic sulfonic acid in a nonaqueous medium an O-phenyl ketoxime of the formula

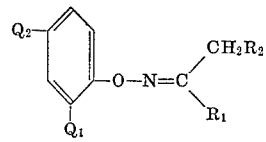

to produce an acid-addition salt of a phenol of the formula

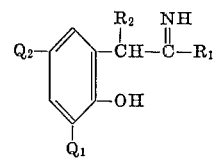

where $Q_1$ and $Q_2$ are each hydrogen, lower-alkyl, halo, lower-alkoxy, nitro, trihalomethyl, carbo-(lower-alkoxy), carboxy, cyano, lower-alkanoyl, phenylsulfonyl or N,N-di-(lower-alkyl)sulfamyl, $R_1$ is lower-alkyl or phenyl, $R_2$ is hydrogen, alkyl having from one to five carbon atoms, or $R_1$ and $R_2$ together constitute —$CH_2CH_2CH_2$— or —$CH_2CH_2CH_2CH_2$—.

2. The process according to claim 1 where the strong acid is a hydrogen halide and the non-aqueous medium is a lower-alkanoic acid or a lower-alkanol.

3. The process according to claim 1 where the strong acid is hydrogen chloride and the non-aqueous medium is acetic acid or ethanol.

4. The process according to claim 1 where the reaction is carried out at about 25 to 35° C.

5. The process according to claim 1 where the ketoxime is an O-phenyl di-(lower-alkyl)ketone oxime, an O-phenyl cycloalkanone oxime having five to six ring-carbon atoms or an O-phenyl lower-alkyl phenyl ketone oxime.

6. The process according to claim 1 where an O-phenyl-acetone oxime is reacted with a strong acid in acetic acid or ethanol to form a 2 - (2 - iminopropyl)-phenol as its acid-addition salt.

7. The process according to claim 1 where an O-phenyl-acetophenone oxime is reacted with a strong acid in acetic acid or ethanol to form a 2 -(2 - imino - 2 - phenylethyl) - phenol as its acid-addition salt.

8. The process according to claim 1 where an O-phenyl-cyclopentanone oxime is reacted with a strong acid in acetic acid to form a 2 -(2 - iminocyclopentyl)-phenol as its acid-addition salt.

9. The process according to claim 1 where an O-phenyl - cyclohexanone oxime is reacted with a strong acid in acetic acid to form a 2 - (2 - iminocyclohexyl)-phenol as its acid-addition salt.

10. An acid-addition salt of the imine of the formula

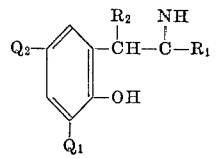

where $Q_1$ and $Q_2$ are each hydrogen, lower-alkyl, halo, lower-alkoxy, nitro, trihalomethyl, carbo-(lower-alkoxy), carboxy, cyano, lower-alkanoyl, phenylsulfonyl or N,N-di-(lower-alkyl)sulfamyl, $R_1$ is alkyl having from one to six carbon atoms or phenyl, $R_2$ is hydrogen, alkyl having from one to five carbon atoms, or $R_1$ and $R_2$ together constitute —$CH_2CH_2CH_2$— or —$CH_2CH_2CH_2CH_2$—, and the acid-addition salt is derived from a strong acid selected from hydrogen halide, sulfuric acid, boron trifluoride etherate or strong organic sulfonic acid.

11. 2 - (2 - iminopropyl) - phenol acid-addition salt according to claim 10.

12. 2 - (2 - imino - 2 - phenylethyl) - phenol acid-addition salt according to claim 10.

13. 2 - (2 - iminocyclopentyl) - phenol acid-addition salt according to claim 10.

14. 2 - (2 - iminocyclohexyl) - phenol acid-addition salt according to claim 10.

References Cited

Sheradsky, T.: Tetrahedron Letters, No. 43, pp. 5225–5227 (1966).

LEON ZITVER, Primary Examiner

G. A. SCHWARTZ, Assistant Examiner

U.S. Cl. X.R.

260—346.2, 465, 470, 471, 519, 556, 586, 999

PO-1050
(5/69)

UNITED STATES PATENT OFFICE
CERTIFICATE OF CORRECTION

Patent No. 3,547,997      Dated December 15, 1970

Inventor(s) Aram Mooradian & Paul E. Dupont

It is certified that error appears in the above-identified patent and that said Letters Patent are hereby corrected as shown below:

Column 1, line 14, "approxiate" should read --approxima-
Column 2, line 39, "ketomixe" should read --ketoxime--; line
"ketoximes" should read --ketoxime--. Column 3, line 4,
"ilustrated" should read --illustrated--; in the formula to tl
right at about line 6, "NH.NCl" should read --NH.HCl--; betwee
the formulas and line 13, insert "I" and "II", identifying the
respective formulas; line 34, before "solution" omit "The" and
place thereof insert --To a--; line 47, "oxime" should read
--oxime,--; line 58, "auetone" should read --acetone--. Colu
line 68, "4-(toyl)" should read --(4-tolyl)--; line 71,
"(4-methoxyphenylaceto-" should read -- (4-methoxyphenyl)acetc
Column 6, line 8, "(4-bromophenylhydroxylamine" should read
--(4-bromophenyl)hydroxylamine--. Column 7, line 18, ")pheny:
should read --)phenol--; line 36, "acetone, oxime" should reac
--acetone oxime,--; line 40, "4.6" should read --4.6 g.--;
line 67, between "nitrophenol" and "hydrogen" insert --p-
toluenesulfonate using 1.7 g. of p-toluenesulfonic acid and 1(
of acetic acid; 2-(2-iminopropyl)-4-nitrophenol--. Column 8,
line 2, "B(1)" should read --C(1)--. Column 9, line 5, "read:
should read --readily--; line 8, "-imniopropyl)" should read
-- -iminopropyl) --; line 50, "5.7" should read --5,7--.
Column 10, Claim 10, in the formula $$\begin{matrix} " & NH & " \\ & | & \\ & -C- & \end{matrix} \quad \text{should read} \quad \begin{matrix} & NH & \\ & " & \\ -- & -C- & -- \end{matrix}.$$

Signed and sealed this 29th day of June 1971.

(SEAL)
Attest:

EDWARD M. FLETCHER, JR.
Attesting Officer

WILLIAM E. SCHUYLER, J
Commissioner of Patent